United States Patent
Criswell (10) Patent No.: US 7,451,270 B1
(45) Date of Patent: Nov. 11, 2008

(54) SYSTEM AND METHOD FOR DETECTING AND CORRECTING ERRORS IN A CONTROL SYSTEM

(75) Inventor: Peter B. Criswell, Bethel, MN (US)

(73) Assignee: Unisys Corporation, Blue Bell, PA (US)

( * ) Notice: Subject to any disclaimer, the term of this patent is extended or adjusted under 35 U.S.C. 154(b) by 773 days.

(21) Appl. No.: 10/675,841

(22) Filed: Sep. 30, 2003

(51) Int. Cl.
G06F 12/00 (2006.01)

(52) U.S. Cl. .............................. 711/112; 714/6; 714/52

(58) Field of Classification Search ................. 711/114, 711/112; 714/6, 52; 710/65
See application file for complete search history.

(56) References Cited

U.S. PATENT DOCUMENTS

| | | | | |
|---|---|---|---|---|
| 4,201,337 A | * | 5/1980 | Lewis et al. .................. 714/785 |
| 4,608,693 A | * | 8/1986 | Baranyai et al. ............. 714/801 |
| 5,371,870 A | * | 12/1994 | Goodwin et al. .............. 710/52 |
| 5,737,744 A | * | 4/1998 | Callison et al. ............. 711/114 |
| 5,774,648 A | * | 6/1998 | Kao et al. ..................... 714/48 |
| 5,794,071 A | * | 8/1998 | Watanabe et al. ............. 710/27 |
| 5,890,219 A | * | 3/1999 | Scaringella et al. ......... 711/162 |
| 6,205,516 B1 | * | 3/2001 | Usami ........................ 711/105 |
| 6,243,666 B1 | * | 6/2001 | Boone et al. .................. 703/20 |
| 6,584,527 B2 | * | 6/2003 | Verinsky et al. ............. 710/305 |
| 6,708,294 B1 | * | 3/2004 | Nakao et al. .................. 714/42 |
| 2004/0193966 A1 | * | 9/2004 | Hirabayashi ................. 714/54 |

* cited by examiner

*Primary Examiner*—Matt Kim
*Assistant Examiner*—Ryan Dare
(74) *Attorney, Agent, or Firm*—Charles A. Johnson; Robert Marley; Richard J. Gregson (57) ABSTRACT

A system and method for detecting and correcting errors within a control system is disclosed. A storage device stores data values that are used to control one or more circuits within the system. This storage device may operate as a slave, such that the storage device is addressed using address signals provided by an external source. This storage device may also operate as master such that some of the data signals that are read from the storage device are used to generate the address for performing the next reference the storage device. In the former slave scenario, and in some cases wherein the storage device is operating as a master, data signals that would otherwise be employed to generate an address are instead employed as check bits to implement an error detection and correction scheme.

34 Claims, 5 Drawing Sheets

SYSTEM AND METHOD FOR DETECTING AND CORRECTING ERRORS IN A CONTROL SYSTEM

FIELD OF THE INVENTION

The current invention relates generally to handling errors within a digital system; and more particularly, relates to an improved system and method for handling errors occurring within a control system.

BACKGROUND OF THE INVENTION

Most general-purpose digital computers provide a system for detecting and handling single-bit or multiple-bit parity errors. The occurrence of parity errors is not uncommon when data signals are being read from storage devices such as static random access memories (SRAMs) and dynamic random access memories (DRAMs). This is especially true when high-density memories are employed, as is generally the case in large data processing systems.

Many factors contribute to the occurrence of parity errors. Sources of contamination such as dust are proportionately increased in size relative to the dimensions of individual transistors employed within high density SRAMs and DRAMs, and are therefore more likely to cause latent defects resulting in parity errors. The presence of alpha particles can also cause parity errors. Alpha particles are randomly generated, positively charged nuclear particles originating from several sources, including cosmic rays that come from outer space and constantly bombard the earth, and from the decay of natural occurring radioisotopes like Radon, Thorium, and Uranium. Concrete buildings, and lead based products such as solder, paint, ceramics, and some plastics are all well-known alpha emitters. Smaller geometry storage devices can be adversely affected by the emission of alpha particles, causing a higher occurrence of parity errors.

In addition to the problems associated with alpha particles and other environmental contaminants, shrinking technology sizes contribute to the occurrence of parity errors. Manufacturing tolerances decrease as geometries decrease, making latent defects more likely to occur. This is particularly true when minimum feature sizes decrease below 0.5 microns.

As discussed above, storage devices such as any type of RAMs are susceptible to the types of error conditions discussed above. This includes control store RAMs of the type often employed to control logic sequencers. It is common, for example, to utilize one or more control store RAMs to control various logic sections of an instruction processor. For instance, consider an instruction decode circuit that is designed to decode an instruction opcode in preparation for instruction execution. The decode circuit may include a control store RAM that stores control signals that may be employed as decoded instruction signals. Specifically, the opcode is presented as an address to a control store RAM. Data read from the RAM may then be used as the decoded instruction to control instruction execution.

Using control store RAMs in the foregoing manner adds flexibility to a logic design. Control over the hardware can be altered by modifying the data stored within the RAMs. As is known in the art, this can be accomplished using a serial scan-set interface, for example. This allows a logic designer to readily add unforeseen changes and/or correct design mistakes. However, as discussed above, these types of devices are prone to parity errors.

One way to detect parity errors is through the use of parity bits, as is known in the art. A detected error may be reported to a maintenance processor, operating system, or other error-handling system, which then initiates some type of recovery action.

Although using parity bits to detect errors provides a relatively straight-forward approach to the foregoing problems, this mechanism is not considered optimal for many control systems that employ control store RAMs. This is because by the time an error is detected in the data word, that error has generally propagated to one or more control lines. As such, operation must often be halted almost immediately so that the error condition can be analyzed and recovery actions can be initiated. This degrades performance, and decreases system resiliency.

Another approach to detecting parity errors involves using an Error Correction Code (ECC). According to this mechanism, check bits provide a code that can be used to detect, and subsequently correct, a parity error. This is desirable where control store RAMs are concerned, since corrected RAM data is then available to control logic sequences, allowing execution to temporarily continue unaffected. The error can be addressed at a later time when the system is configured for error analysis and recovery.

One problem with using an ECC mechanism to detect a parity error is that, in general, a relatively large number of check bits are required to detect and correct an error. For example, a typical ECC scheme that is applied to computer memories is the Single Error Correcting/Double Error Detecting (SEC/DED) type of code that requires eight check bits to correct an error in a sixty-four bit word. This type of code is referred to as a "[64,72]" ECC code. These check bits must be stored along with the data word. However, because control store RAMs may be hundreds of bits wide, storing the number of check bits that are required to perform error correction will require that the RAM width be increased by a substantial amount. For example, a RAM that is three hundred twenty bits wide and employs five [64,72] SEC/DED codes to provide ECC coverage will require the storing of forty check bits. This may increase the size of the RAM beyond what is acceptable for the particular control store device application.

What is needed, therefore, is an improved system and method for detecting, then correcting, errors in a control store RAM that addresses the foregoing problems.

SUMMARY OF THE INVENTION

The current invention provides a system for adding check bits to a storage device such as a control store RAM without increasing the device width. According to the invention, the storage device stores data values that are used to control one or more circuits within the system. This storage device may receive addresses from at least two sources. When the storage device is operating as a slave, it is addressed using address signals provided by an external source. For example, an address may be read from a master RAM and provided to the storage device, which is operating as the slave. Data read from the slave storage device is used to control the one or more circuits within the system. In contrast, the storage device may be operating as a master. In this case, some of the data signals that are read from the storage device are used to generate the address signals needed to perform the next reference the storage device. That is, the storage device and associated logic are operating in a "self-addressing" mode.

Several scenarios are possible while the storage device is executing as a master. In some cases, a relatively large number of control signals that are read from the storage device are needed to generate the address to be used during the next storage device reference. In other less complex cases, the next address is generated using a relatively small subset of the control signals that are read from the storage device. For instance, when operating in an address incrementation mode, most of the control signals are not needed to generate the next address.

As may be appreciated from the foregoing, when the storage device is either operating as a slave, or is functioning as a master during one of the simple addressing modes, many of the control signals read from the storage device are not used for address generation. These signals are therefore available to be used for another purpose. According to the current invention, these unused signals may be employed as check bits. These check bits are provided to an error detection circuit for use in detecting whether one or more data signals read along with the check bits have been corrupted. In one embodiment, this error detection also detects errors occurring within the check bits themselves.

According to one aspect of the invention, errors occurring in predetermined ones of the data signals may be corrected and forwarded to the one or more circuits that are being controlled by the storage device. Although these errors are reported to a maintenance processor or some other error recovery means, error recovery actions need not take place immediately. Instead, recovery may be performed at a time when the system is not undergoing high-priority processing tasks, or is configured to more readily perform recovery operations.

According to another aspect of the invention, some errors may be considered uncorrectable. Such uncorrectable errors may include those errors that are detected on signals that were used to control functional logic before the error correction could be completed, or those occurring on signals considered necessary for controlling the error detection and correction operations. Parity checking is performed to detect these uncorrectable errors. When these types of errors are detected, recovery is performed in a more expedited manner than when the error has been corrected. This is necessary to prevent an error from corrupting system operations. Parity checking may also be provided to detect errors occurring on the data signals when the system is not utilizing the check bits to perform error correction.

In one embodiment of the invention, various aspects of the system may be programmably selected. This may be accomplished using a scan-set interface, for example. For instance, the data signals that are used as check bits may be selectable. In another embodiment, the data signals that are considered uncorrectable may be programmably selected. This provides an additional level of flexibility to the design.

According to one aspect of the invention, a control system is disclosed that includes a storage device to store data signals. A circuit is coupled to the storage device to receive as control signals predetermined ones of the data signals. These control signals control operation of the circuit when the circuit is operating in a first mode. Error Correction Code (ECC) logic is coupled to the storage device to interpret the predetermined ones of the data signals as ECC check bits to detect errors in the data word when the circuit is operating in a second mode.

In another embodiment of the invention, a method of controlling a digital system is described. The method includes the steps of reading first data signals from a storage device, interpreting the first data signals as control signals to control one or more functions of the digital system if operating in a first mode of operation, and interpreting the first data signals as Error Correction Code (ECC) signals if operating in a second mode.

According to still another aspect of the invention, a control system is described that has a first and second mode of operation. The control system comprises storage means for storing data signals, and control means for utilizing first ones of the data signals to affect operations of the control system when operating in the first mode. This system further includes error means for interpreting the first ones of the data signals as check bits for use in detecting errors occurring in second ones of the data signals when the control system is operating in the second mode.

Other aspects and embodiments of the invention will become apparent from the following description and the accompanying drawings.

DETAILED DESCRIPTION OF THE PREFERRED EMBODIMENT

Figure 1:
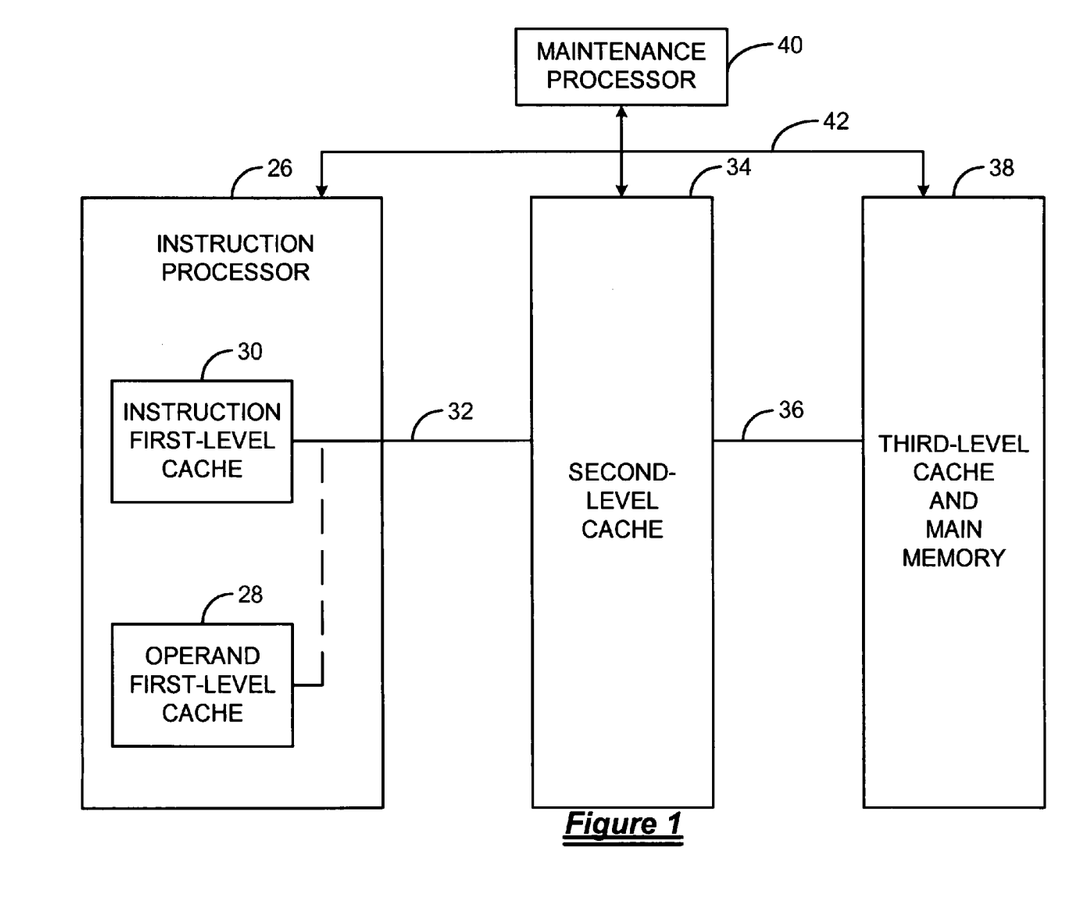
FIG. 1 is a schematic block diagram of an exemplary data processing system that may utilize the current invention.

FIG. 1 illustrates one embodiment of a system that may usefully employ the current invention. However, many other types of systems may utilize the current invention, as will become apparent to those skilled in the art from the following description and accompanying drawings.

The system of FIG. 1 includes an Instruction Processor (IP) 26 having both an Operand First-Level Cache (O-FLC) 28 and an Instruction First-Level Cache (I-FLC) 30. The O-FLC and I-FLC are relatively small, fast, memories for storing recently used operands and instructions, respectively, to speed instruction execution within the IP as is known in the art.

I-FLC and O-FLC are coupled via Interface 32 to a Second-Level Cache (SLC) 34 storing both instructions and operands. Requests for instructions or operands are made to the SLC when the instructions or operands are not located within the I-FLC 30 or the O-FLC 28, respectively. Similarly, the SLC 34 is coupled via memory interface 36 to additional storage shown as memory 38. When a request is made to the SLC for an item not stored in the SLC, the request is forwarded to memory 38 for processing. In one embodiment, memory 38 includes both a third-level cache and a main storage unit. The implementation details of memories 34 and 38 are beyond the scope of this application.

The logic of FIG. 1 further includes a maintenance processor 40 coupled to a scan interface 42. This maintenance processor may perform scan-set operations via the scan interface as is known in the art. These operations may be performed to initialize any of the logic sections shown in FIG. 1. Additionally, scan-set operations may be used to perform recovery and re-initialization procedures following the detection of errors. This will be discussed further below.

Figure 2:
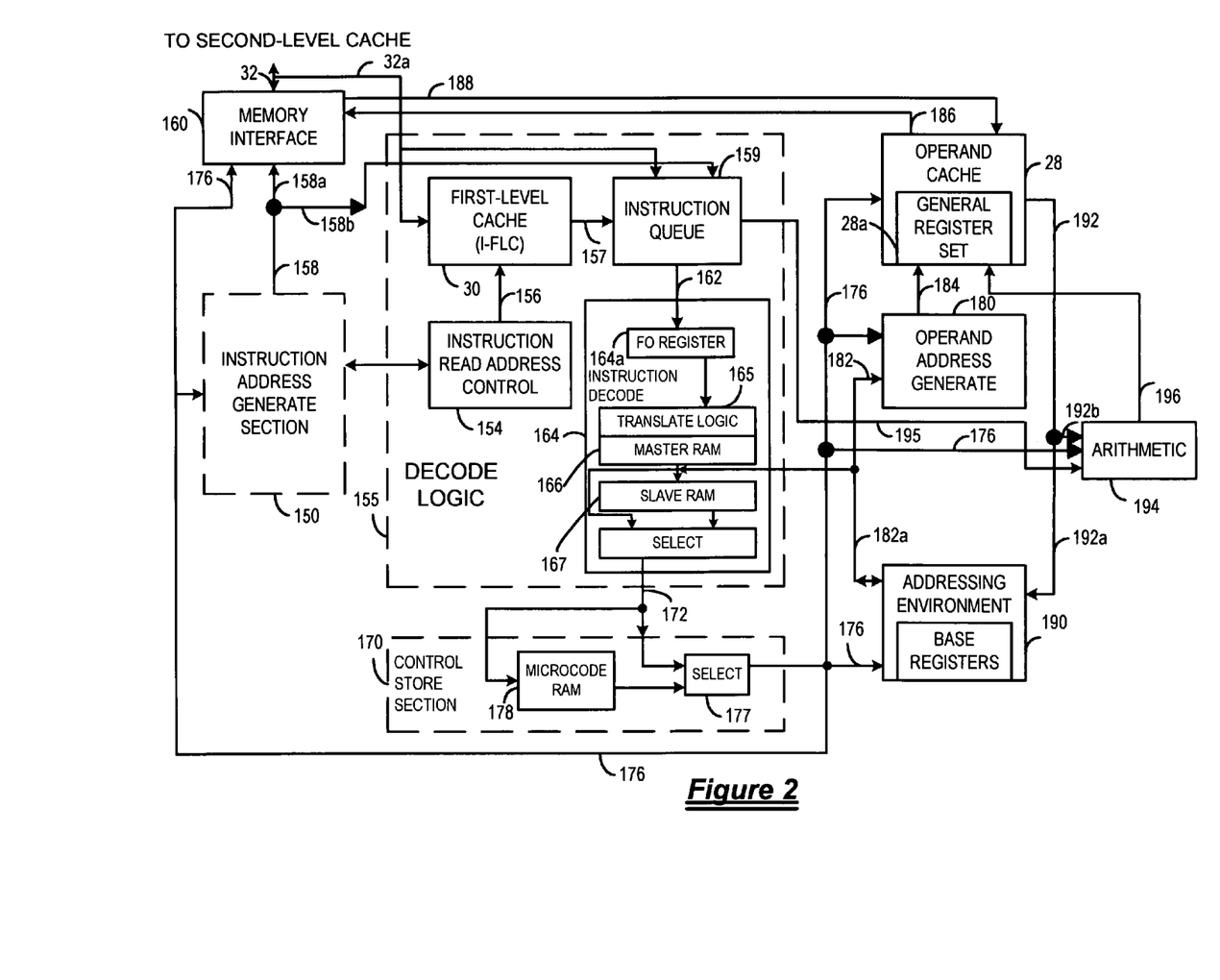
FIG. 2 is a schematic block diagram of an exemplary Instruction Processor that may utilize the current invention.

FIG. 2 is a block diagram of one embodiment of an Instruction Processor (IP) that may utilize the current invention. This embodiment will be understood to be exemplary only, and many other types of IP architectures may usefully employ the inventive system and method. The IP of the preferred embodiment includes an instruction address generate section 150 that generates an absolute address used to retrieve an instruction. This address is provided via instruction read address control 154 to the IP Instruction First-Level Cache (I-FLC) 30 within decode logic 155 (shown dashed). If a cache miss does not occur and the addressed instruction is resident within I-FLC 30, the addressed instructions are transferred to an instruction queue 159 over lines 157 to be staged so that decode may begin.

If a cache miss occurs, the IP suspends execution. Lines 158*a* communicate the miss to the IP memory interface 160, which initiates a memory request to the SLC 34 via interface 32. When the instruction is returned, it is provided on data path 32*a* to instruction queue 159 and to the I-FLC 30 to be cached.

Once in the instruction queue 159, the instruction is staged through a series of staging registers (not shown in FIG. 2), and begins decode. Partially decoded instruction signals are provided on lines 162 to the instruction decode section 164, and the instruction opcode is loaded into an instruction register referred to as "F0 register" 164*a*. The instruction opcode is translated by translate logic 165, and the translated instruction signals are provided to a master RAM 166 as an address. Signals read from the master RAM are used to control the rest of the IP during the first clock cycles of instruction execution. These signals are also provided as an address to slave RAM 167 to read additional control signals that are then used to control the remaining cycles of instruction execution. This is largely beyond the scope of the current invention. More details about instruction decode can be obtained from the co-pending application entitled "System and Method for Controlling the Entry of Instructions into a Pipeline of an Instruction Processor", Ser. No. 09/419,439, filed Oct. 15, 1999.

The control signals provided by master RAM includes addresses provided over lines 182 to the operand address generate section 180, which generates an operand absolute address that is provided to the Operand Cache (O-FLC) 28 so that an instruction operand may be retrieved.

After the absolute operand address has been received by the O-FLC 28, it is determined whether the addressed operand is resident in this cache. If the operand is not resident, the IP suspends instruction execution and initiates a memory read operation using a real address generated by the O-FLC 28. This real address is transferred over lines 186 to the memory interface 160, which then controls the memory request to the SLC 34 over interface 32. After the operand is returned, it is provided to the O-FLC 28 on lines 188.

Operand data is made available over lines 192*b* to the arithmetic section 194 for use in performing binary, floating point, and decimal arithmetic operations. The results of these operations are stored back to a set of storage devices known as the General Register Set (GRS) 28*a* over lines 196.

Also shown in FIG. 2 is Control Store (CS) section 170, which is a microcode-controlled sequencer. During execution of most "standard" instructions, CS logic does not exercise control over the other logic sections. Instead, control is provided by signals on lines 172 that are generated by decode logic 155 and re-driven by CS section 170 onto lines 176. For other non-standard "extended mode" instructions, signals generated by a microcode RAM 178 are selected by select logic 177 and provided on lines 176. This allows the CS section to assert control over the other logic sections. The operation of the CS section is largely beyond the scope of the current invention. For details on a microcode controlled sequencer for an instruction processor, see commonly-assigned U.S. Pat. No. 5,911,083 to Kuslak, incorporated herein by reference.

Many of the logic sections shown in FIG. 2 may be implemented using one or more control store Random Access Memories (RAMs). A control store RAM stores signals that are used to control other logic within the same, or a different, logic section. For example, consider the instruction decode sub-section 164, which decodes an instruction opcode loaded into F0 register 164*a*. This is accomplished by presenting the translated opcode as an address to master RAM 166. Some of the data read from this RAM is provided to the rest of the IP on lines 172 and 182 as control signals that control instruction execution. Other signals from the master RAM are used as an address to read signals from slave RAM 167, which also control other logic sections during instruction execution.

The control section 170, like the instruction decode sub-section 164, also uses a control store RAM. Specifically, microcode RAM 178 stores control signals that are used to control the IP logic sections during extended mode execution. In general, any logic section may usefully employ control store RAMs in a similar manner. This will be discussed further below in regards to arithmetic section 194.

Using control store RAMs within a control system adds flexibility to a logic design. Control over the hardware can be altered by modifying the data stored within the RAMs. As is known in the art, this can be accomplished using a scan-set interface such as that shown in FIG. 1.

Figure 3:
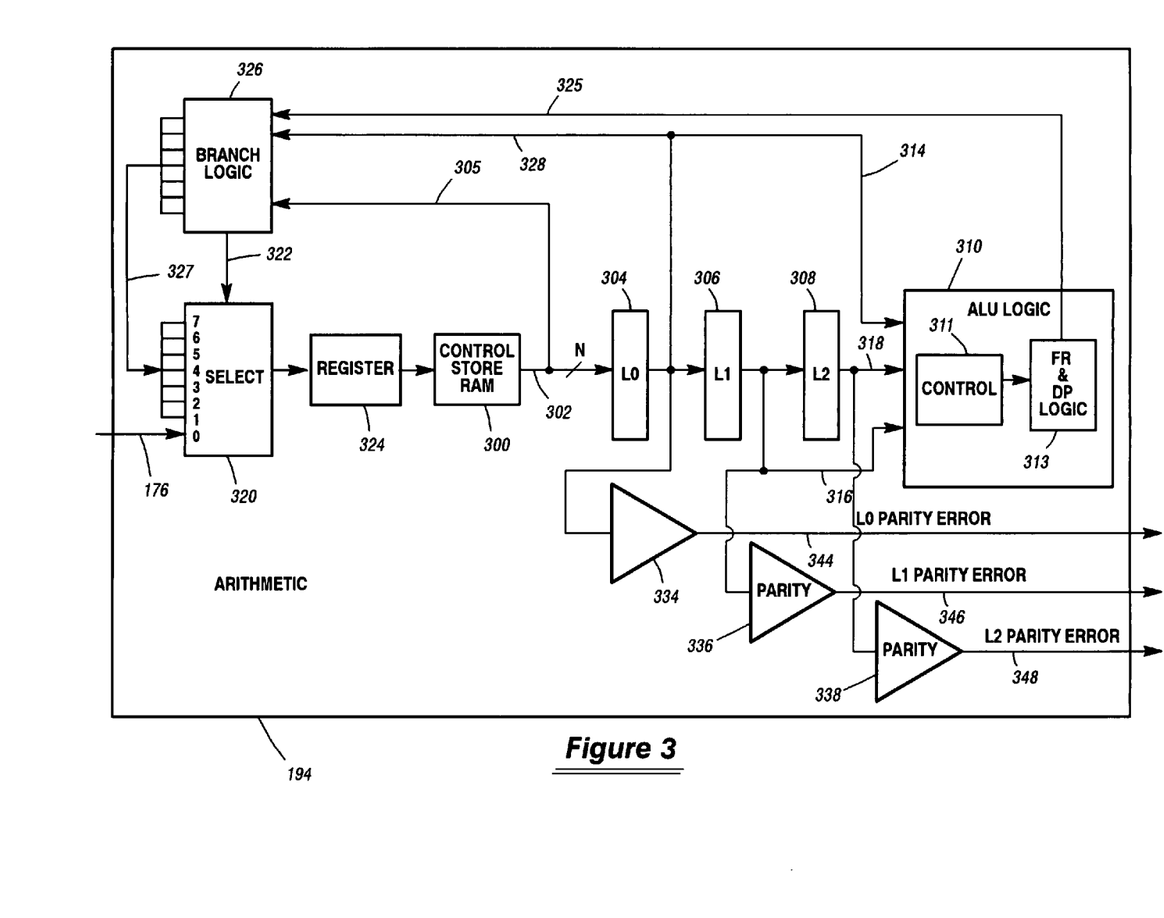
FIG. 3 illustrates exemplary control store RAM logic.

FIG. 3 is a logic block diagram of exemplary control store RAM logic. For discussion purposes, it will be assumed that this logic resides within arithmetic section 194. However, as discussed above, such systems could be usefully employed within any of the logic sections shown in FIG. 2, within control logic of SLC 34 or memory 38, or any other type of digital control system.

The exemplary system of FIG. 3 includes a control store RAM 300. Data stored in this RAM is read onto lines 302 and staged during successive clock cycles into staging registers L0 304, L1 306, and L2 308. These staging registers provide control signals on lines 314, 316, and 318, respectively, to ALU logic 310. This ALU logic includes a control section 311 that uses the received signals to control the Function Registers and Data Paths (FR&DP) 313 of the ALU. This provides the arithmetic processing capability for IP 26.

As is typical with many control store systems, the control store RAM of FIG. 3 can operate as either a master or a slave. When operating as a slave, the address for control store RAM 300 is provided by some external logic. That is, the address is not generated via information provided by control store RAM 300 itself. In the current example, when control store RAM is operating as a slave, the address is provided on lines 176, which may be driven either by instruction decode 164 or signals provided by microcode RAM 178 of control store section 170, as discussed above.

The address on lines 176 is provided to select logic 320. If selected by the selection signals 322, it is latched into register 324, and provided to control store RAM 300 to be used as the address during the next clock cycle. Data signals stored at this address are read onto lines 302, and are latched into register L0 304.

Branch logic receives some of the signals that are read from control store RAM 300 as well as some of the signals latched in register L0 304. These signals, which are received on lines 305 and 328, respectively, are employed by branch logic to generate one or more addresses that are forwarded to select logic 320 on lines 327. Branch logic further generates selection signals 322 which are used to select either the address on lines 176, or one of the addresses generated by branch logic. This selected address is then used to address control store RAM 300 during the next clock cycle.

As noted above, when the address on lines 176 is selected by select logic 320 as the next address, control store RAM is said to operate as a slave. In contrast, if one of the addresses provided by branch logic 326 is selected, the control store RAM is operating as a master, since the next address is generated using signals read from the control store RAM itself, as well as signals generated by FR & DP logic 313 on lines 325. The signals on lines 325 provide the conditional branching capability for the system. The determination as to whether to operate as a master or a slave is made using the state of one or more predetermined bits that are stored within control store RAM 300 and provided to branch logic 326 on lines 328.

One significant problem with using control store RAMs of the type shown in FIG. 3 involves the relatively high error rates associated with such devices. Alpha particles and other environmental contaminants can result in the occurrence of correctable errors. Additionally, shrinking technology sizes can result in problems with both correctable and uncorrectable errors. Manufacturing tolerances decrease as geometries decrease, making latent defects more likely to occur. This is particularly true when minimum feature sizes decrease below 0.5 microns.

One way to detect, and in some cases correct, errors involves using an Error Correction Code (ECC). As is known in the art, ECC schemes utilize a check bit code that, when compared to the associated data bits, can be used to detect, and in some cases, correct, errors. Errors can be corrected when fewer than a predetermined number of data bits are involved in the error. According to Single Error Correction/Double Error Detection (SEC/DED) ECC schemes, all single-bit errors may be corrected, and double-bit errors are detected.

The problem with employing an ECC scheme of the type discussed above is that a relatively large number of check bits are required to implement the ECC mechanism. For example, one common ECC mechanism, sometimes referred to as a "[64,72]" scheme, utilizes a group of eight check bits to cover sixty-four data bits. This scheme requires five groups of eight, or a total of forty, check bits to perform single-bit error correction on a data word that is three hundred twenty bits wide. Storing this additional number of check bits in the control store RAM requires a significant increase in the RAM width. This is not a desirable solution, since the area consumed by the RAM on a silicone die will then increase in a manner that may adversely affect the size of the integrated circuit that includes the RAM.

As an alternative to using an ECC scheme, error checking without correction may be employed. For example, in the circuit of FIG. 3, parity checkers 334, 336, and 338 are provided to check for parity errors on data provided by the staging registers L0, L1, and L2, respectively. If a parity error occurs, one or more of the L0, L1, and L2 parity error signals on lines 344, 346, and 348, respectively, are activated. This initiates system error handling procedures. For example, in one embodiment, maintenance processor 40 may initiate a scan operation that re-initializes the contents of control store RAM 300 in attempt to correct the error(s). If an uncorrectable, rather than a correctable, error has occurred, the corrupted address or address range may be designated as unusable. However, because this process does not correct the data as it is read from the RAM, the system cannot continue running temporarily until the error handling process can be more conveniently initiated. Instead, the system must be halted substantially immediately upon detection of the error.

Thus, it would be preferable to utilize a correction scheme that does not impose the burden of increasing the control store RAM width.

According to the current invention, check bits are added without increasing the width of the control store RAM 300 by assigning a dual purpose to one or more of the data fields stored within the control store RAM. That is, data bits used for one purpose within one context may be used as check bits in another type of situation. Many of the data bits provided on lines 328 to branch logic 326 can be assigned this type of dual purpose for the following reason.

Circuits of the type shown in FIG. 3 will often operate with control store RAM being a slave. In this case, the address for control store RAM 300 is provided on lines 176 from other logic sections. Branch logic 326 provides selection signals on lines 322, but does not generate alternative addresses on lines 327. As such, branch logic 326 requires the use of only a small subset of the signals on lines 328. On occasion, however, data read from control store RAM will include a data field that is set to a state that will cause the control store RAM to operate as a master. This data field is provided on lines 328 to branch logic 326.

When control store RAM is operating as a master, some of the signals on lines 328 are required by branch logic 326 to generate the alternative addresses that will be driven onto lines 327. In complex addressing scenarios, most of the signals on lines 328 may be required for this purpose. In other more simple addressing cases, only a relatively small subset of these signals may be required for address generation. This may be the case, for example, when the next address is generated using a simple address incrementation scheme, as will be described further below.

As can be appreciated from the foregoing, during the majority of execution cycles, a relatively large number of the signals provided on lines 328 are not used. These signals could be re-assigned to function as check bits while the control store RAM 300 is functioning as a slave, or in one of the less complex address generation scenarios when the control store RAM is operating as the master. This is discussed further in reference to FIG. 4.

Figure 4:
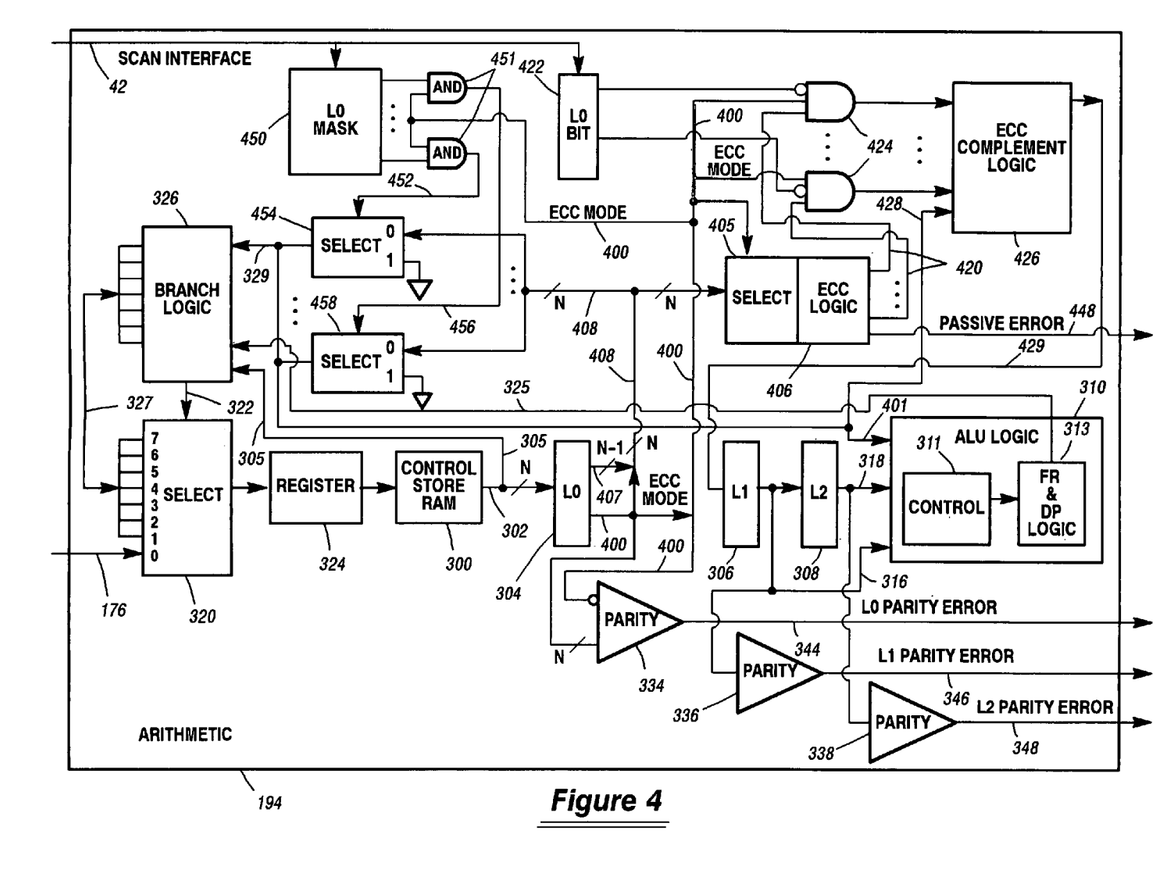
FIG. 4 is a block diagram of one embodiment of the current invention.

FIG. 4 is a logic block diagram of the system of FIG. 3 being adapted to utilize the current invention. In FIGS. 3 and 4, like elements are assigned like numeric designators.

According to one embodiment of the invention, RAM 300 is 300 bits wide, although any other RAM width may be used in the alternative. Each word of RAM 300 includes an ECC mode designator. When a data word is read from control store RAM 300 having the ECC mode designator in an active state, the system operates in "ECC mode" wherein predetermined bits in the data word are interpreted as check bits. Otherwise, these predetermined bits are interpreted as functional bits, some of which are provided to branch logic 326 for use in generating the selection signals 322 and alternative addresses on lines 327, and others of which are ultimately forwarded on lines 401 to ALU logic 310 to control arithmetic processing.

The ECC mode designator is activated for a given word if the control store RAM 300 is operating as a slave. This designator is also activated if the control store RAM is operating as a master in one of the less complex addressing scenarios. For example, in a scenario wherein the next address for control store RAM 300 is generated by incrementing the previous address, only a small subset of control lines 328 are required to control address generation. In a similar scenario, a simple "GOTO" target operation may be employed that provides the next target address on a small subset of lines 328. In these types of less complex master addressing scenarios, as well as when control store RAM is operating as a slave, a large number of the signals on lines 328 are not used by branching logic 326 to generate the next address. Therefore, some, or all, of these unused signals may be used as ECC check bits. When operating as a master in complex addressing situations, however, the ECC mode designator is cleared to indicate that signals that might otherwise be used as the check bits are needed by branch logic 326 to generate instruction branch addresses. This will become more apparent from the following examples.

Assume the system of FIG. 4 is operating with control store RAM 300 as a slave. Therefore, an address presented on lines 176 is selected by select circuit 320, latched within register 324, and provided to control store RAM 300. A data word is read from control store RAM having the ECC mode designator activated, indicating that predetermined bits within this word will be interpreted as check bits. This data word is latched within L0 register 304.

The activated ECC mode designator is driven by L0 register 304 onto line 400, and the remainder of the data word is provided on lines 407. The ECC mode designator is provided to parity checker 334 to disable parity checker 334. This is necessary so that a parity error will not be generated on line 344, as will be discussed further below.

The entire data word, including the activated ECC mode designator, is provided on lines 408 to ECC logic 406. This logic will be used to detect an error on the data word. Predetermined bits included within this data word are interpreted as check bits by ECC logic 406. For instance, in a system that utilizes a "[64,72]" scheme of the type discussed above, five groups of check bits are provided to the ECC logic, each covering a respective group of sixty-four data bits. In one exemplary embodiment, the bits that are to be interpreted as the check bits are selected by a select circuit 405, which is controlled by the ECC mode designator and addressing mode signals provided on lines 408. This will be discussed further below. In another embodiment, select circuit 405 is not used, and predetermined signals on lines 408 that are designated as the check bits are instead "hardwired" to the check bit inputs of the ECC logic so that they are not selectable.

In either of the foregoing embodiments, ECC logic 406 uses the check bits to determine whether an error has occurred within any of the bits of the data word. In particular, ECC logic uses the check bits to generate decoded syndrome codes. For instance, in a system utilizing a "[64,72]" scheme, ECC logic uses each group of check bits to generate an error syndrome code which is decoded to provide a complement control bit for each bit in the respective data group. These complement control bits are concatenated with similar bits from the other ECC groups so that lines 420 include a complement control bit for each bit in L0 register 304. A bit is set on lines 420 if ECC logic 406 determines that the corresponding data bit is in the wrong state.

In addition to providing the syndrome information, ECC logic 406 provides a passive error signal 448 to maintenance processor 40 to indicate that a one or more of the bits in the data word are determined to be in the wrong state. Assuming that a parity error is not subsequently detected on the data word by parity checkers 336 or 338 indicating that the error was not corrected, maintenance processor 40 may respond to the passive error at some time in the future when the system is configured to do so. That is, the maintenance processor need not halt execution immediately to perform error recovery operations. The detection of a parity error on lines 346 and 348 is discussed further below.

Not all errors that are detected by ECC logic 406 are considered correctable. For example, a relatively small subset of the signals included within a data word is provided directly by control store RAM 300 on lines 305 to branch logic 326 for use in performing branch operations. Additionally, a subset of the bits latched within L0 register 304 is provided to branch logic 326 on lines 329 for a similar purpose. Finally, some of the bits of a data word are driven indirectly from register L0 via lines 401 to ALU logic 310. These bits are employed to control arithmetic operations before error correction is completed, as is required to conform to timing constraints. Because these bits are provided to control the functional logic before any associated errors can be corrected, thereby allowing the errors to propagate to the functional logic, these signals are considered uncorrectable.

In addition to the signals described above, signals that control the operation or mode of the ECC logic itself are considered uncorrectable. For example, an error in the ECC mode designator 400 will result in incorrect interpretation of the mode of operation, leading to an incorrect interpretation of the field that contains the check bits during ECC mode operation. For this reason, the ECC mode designator 400 is not considered correctable. Similarly, as discussed above, while operating in ECC mode, a small subset of the bits stored in L0 register 304 is employed to determine whether a "GOTO" target operation, address incrementation, or another addressing mechanism will be used to obtain the next target address. These bits are considered uncorrectable because an error in this field will result in misinterpretation of the ECC check bits and other branching control bits. Finally, some bits of a data word are considered uncorrectable if they are not employed at all during ECC mode operation. Such bits are set to predetermined logic levels to avoid the initiation of unwanted logic sequences. Because these bits are masked to predetermined logic levels, errors occurring in any of these bits are not propagated to the L1 and L2 registers to affect system operations, and may therefore be ignored. This is discussed below.

To summarize the foregoing, some bits of a data word are considered uncorrectable, and any error that is detected in these predetermined bits should not be corrected. Instead, the error should be allowed to propagate to the L1 and L2 registers so that parity checkers 336 and 338 will detect the error in a manner that will initiate immediate recovery actions.

In one embodiment, the data bits that are to be considered uncorrectable are programmably selected by values stored within L0 bit register 422 and L0 mask register 450. Each of these registers is as wide as the control store RAM, which in the current example is 300 bits wide. A bit is designated as being uncorrectable by setting a corresponding bit in L0 bit register 422 and clearing a corresponding bit in L0 mask register 450.

When a bit of L0 bit register 422 is set, it blocks a respective one of the complement control bits on lines 420 from being passed to correction logic 426. In one embodiment, this blocking function is performed by a bank of "AND" circuits 424, which are further controlled by ECC mode designator 400 such that a complement control bit on lines 420 is gated to ECC complement logic 426 only if the corresponding bit within L0 bit register 422 is deactivated, and the ECC mode designator is activated to indicate ECC logic is enabled. Otherwise, if either of these conditions is not met, the complement control bit is forced to an inactive state before it is provided to ECC complement logic 426. This will be discussed further below.

If one of the complement control bits on lines 420 is provided to correction logic 426 in an active state, a correctable error has been detected on the corresponding data bit provided on lines 428. Correction logic 426, which in one embodiment is an "XOR" circuit, modifies the erroneous bit on lines 428 to the correct state. The corrected data word is provided on lines 429, is latched into register L1 306, and is further latched into register L2 during a subsequent clock cycle.

Data latched into registers L1 306 and L2 308 is checked for parity errors by parity checkers 336 and 338, respectively. This parity verification is performed using a parity field stored within each word of control store RAM 300. This parity field is provided in addition to the check bits that are used when control store RAM is operating in ECC mode. When not operating in ECC mode, this parity field provides the sole error detection protection for the system. Detected parity errors are provided to maintenance processor 40 on lines 346 and 348.

The foregoing description outlines the manner in which a data word that stores an activated ECC mode designator is read from control store RAM 300 and subsequently processed. In this ECC mode scenario, most errors can be corrected using ECC. That is, errors occurring in control signals that are used to control functional arithmetic logic only after they have been latched within the L1 and L2 registers, and which are not used by functional logic directly from control store RAM 300 or L0 register 304, are "scrubbed" of all detected correctable errors. Since these errors result only in activation of the passive error signal 448 rather than the activation of one of the parity error signals, the maintenance processor 40 need not initiate immediate recovery actions, but may instead initiate recovery actions at a time determined to be more appropriate.

As previously described, not all errors are considered correctable. A data bit is designated as uncorrectable by activating a corresponding bit within L0 bit register 422 and deactivating a corresponding bit within L0 mask register 450. The purpose for deactivating the L0 mask register bit is described below. The bit within the L0 bit register is activated to force the associated complement control bit on lines 420 to an inactive state before it is provided to ECC complement logic 426. As a result, no error correction will occur for the corresponding data bit, and the error will be stored in the L1 and L2 registers. Parity checkers 336 and 338, which are not disabled by the ECC mode designator, will detect this error and activate the L1 and L2 parity error signals, respectively. Activation of these signals will result in termination of execution within a relatively short period of time after the error is detected. Execution must be terminated because the error most likely affected functional operation. Maintenance processor 40 may then attempt to reinitialize control store RAM 300 to scrub the error.

As discussed above, some of the bits stored within L0 register 304 are provided to functional logic, including branch logic 326 and ALU logic 310. Most of these bits are only used when control store RAM is operating as a master during complex addressing scenarios. During ECC mode, some of these bits that are provided to branch logic 326 and ALU logic 310 are used as check bits, while others remain entirely unused. The functional signal lines that are otherwise controlled by these bits must be held at an appropriate logic level during ECC mode to ensure that logic sequences are not erroneously initiated. This functionality is performed by L0 mask register 450 and the associated logic as follows.

L0 mask register 450 includes a mask that has a respective bit for each bit in the data word on lines 408. A mask bit is activated if the respective data bit is not used functionally during ECC mode by branch logic 326 or ALU logic 310. For example, a mask bit is set if the corresponding data bit is employed as a check bit during ECC mode. This is the case because a check bit is not used to control functional logic while the system is operating in ECC mode, but is instead used by ECC logic 406 to perform error detection. As another example, a mask bit is set in L0 mask register 450 if the corresponding data bit is not used at all during ECC mode. This is the case for some bits that are needed to control the more complex branching operations, but which remain unused during simple branching operations executed during ECC mode. Conversely, as noted above, a bit is de-activated within L0 mask register 450 if the corresponding data bit is used functionally before error correction occurs, and is therefore considered uncorrectable.

When ECC mode designator 400 is activated, each mask bit from L0 mask register 450 is gated by a respective one of AND circuits 451 to a corresponding select circuit to be used as a selection signal. For example, the mask bit on line 452 is provided to select circuit 454, the mask bit on line 456 is provided to select circuit 458, and so on.

If a mask bit provided by L0 mask register 450 is activated, the respective select circuit selects a signal that is tied to an appropriate logic level based on the requirements of the functional logic. It will be noted that although FIG. 4 illustrates each of select circuits 454 through 458 as having an input signal tied to a low logic level, it will be understood that one or more of these circuits may have an input that is instead tied to a high logic level to satisfy the requirements of the functional logic to which the signal is provided. If a respective mask bit is instead inactive, a signal driven from L0 register 304 is selected by one of select circuits 454 through 458. In this manner, while operating in ECC mode, the data bits that correspond to activated bits stored within L0 mask register 450 are not provided to the functional logic. Only the signals that are used functionally during ECC mode are re-driven to branch logic 326 on lines 329, to ALU logic 310 on lines 401, and to ECC complement logic 426 on lines 428.

As discussed in the foregoing paragraph, the check bits are replaced with predetermined signal levels by the select circuits 454 through 458 before the data word from L0 register 304 is provided on lines 428 to ECC complement logic. The ECC complement logic will not attempt to correct these bits because the corresponding bits within L0 bit register 422 will be programmed to an active state, as discussed above. The pre-selected signal levels for these bits will therefore be re-driven onto lines 429 to L1 register 306.

As mentioned above, an additional parity field is provided in addition to the ECC check bits to be used by parity checkers 336 and 338 to check parity on the data words latched in the L1 and L2 registers 306 and 308, respectively. When operating in ECC mode, the check bits and any other bits that are not used by the functional logic will be replaced by appropriate predetermined logic levels by the time those bits are latched within L1 register 306, as discussed in the previous paragraph. Therefore, for data words that include an activated ECC designator, the parity field must be calculated as though the check bit field and other unused bits contain the predetermined logic levels. Otherwise, L1 and L2 parity errors will be detected. As a result, this parity field will not be correct for data latched within L0 register 304, since the check bit field and any unused bits have not yet been replaced by select circuits 454 through 458. Therefore, to prevent activation of the L0 parity error 344, parity checker 334 must be disabled when ECC mode designator 400 is activated.

The discussion above describes the scenario wherein the activated ECC mode designator gates the mask stored within the L0 mask register 450 to select circuits 454 through 458 so that the check bit field and any unused bits within the data word will be replaced by the appropriate predetermined signal levels. In contrast, when the ECC mode designator is inactive, the signals from L0 mask register 450 are forced inactive. This causes the signals on lines 408 to be selected by the select circuits. Some of these signals are provided to branch logic 326, ALU logic 310, and ECC complement logic 426. As discussed above, branch logic 326 employs some of these signals to generate addresses on lines 327. In this mode, these signals are not corrected by ECC complement logic 426 because the complement control bits on lines 420 are not gated to this logic. The uncorrected data word is latched within L1 and L2 registers to be checked by parity checkers 336 and 338, respectively. Since the ECC mode designator is inactivated, and no fields are zeroed on lines 429, the parity field that is provided with the data word is calculated across the entire data word.

According to one aspect of the invention discussed above, the bits on lines 408 that will be employed by ECC logic 406 as the check bits are selected by select circuit 405. Specifically, when the ECC mode indicator is activated, select circuit 405 employs some of the signals on lines 408 as selection signals. The signals used for this purpose are those that indicate which addressing mode will be used to generate the next address, thereby also providing an indication as to which bits are available for use as check bits. Of course, the bits that are selected as check bits must be a subset of the bits that are designated as being functionally unused during ECC mode by the value stored within L0 mask register 450. This is a requirement since the value that is programmably stored within L0 mask register 450 will not be changed from cycle to cycle during normal system operations.

As will be appreciated by those skilled in the art, the aspect described in the foregoing paragraph adds flexibility to the design, since the bits that are selected as check bits may be programmably controlled using data stored within control store RAM 300. Additional design flexibility is provided by the programmable values stored within L0 mask register 450 and L0 bit register 422. These aspects of the system allow field definitions to change as system requirements are modified.

Figure 5:
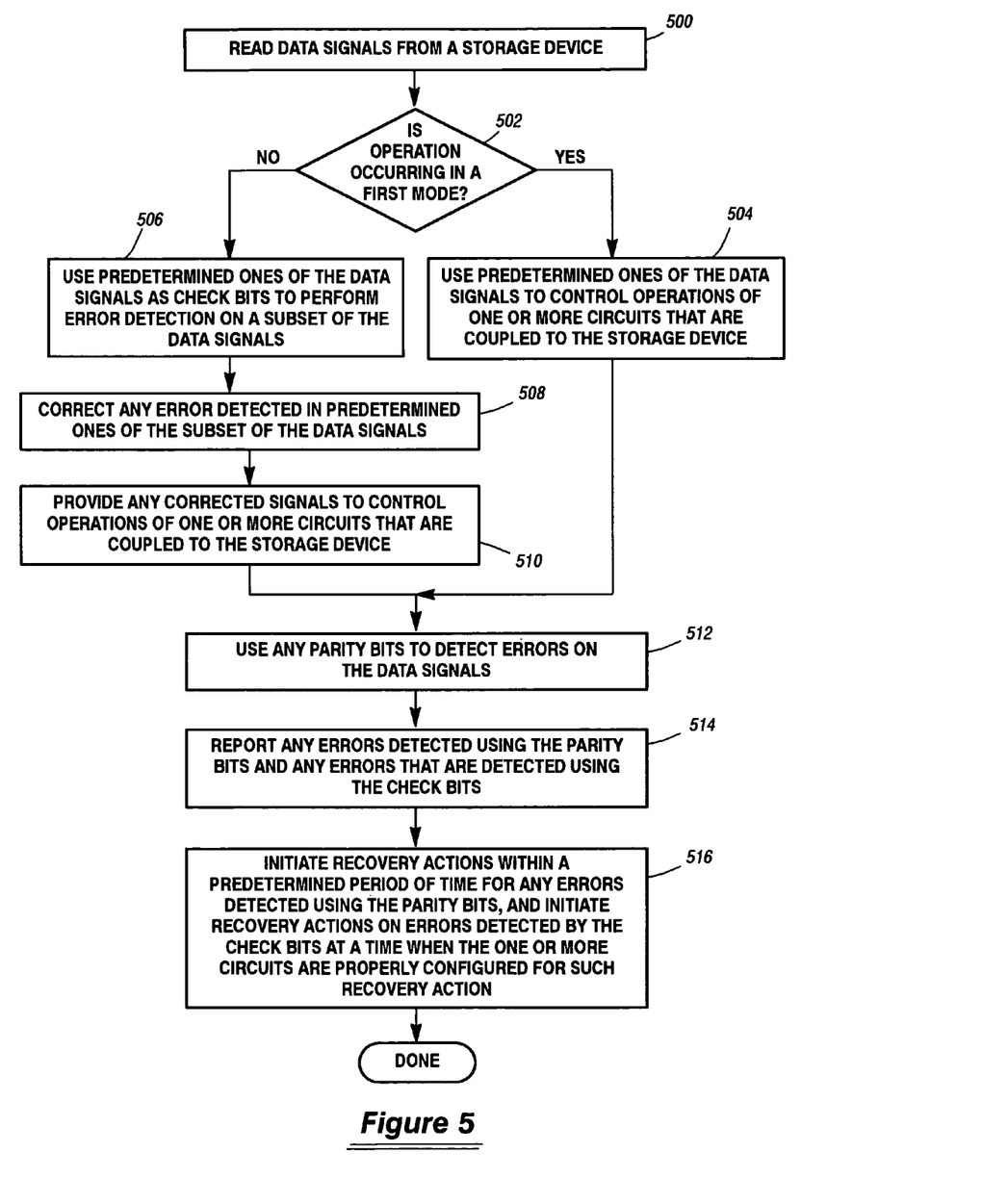
FIG. 5 is a flow chart of one method according to the current invention.

FIG. 5 is a flow chart of one method according to the current invention. First, data signals are read from a storage device such as a control store RAM (500). Next, it is determined whether the system is operating in a first or a second mode (502). If operation is occurring in a first mode that does not have the ECC designator activated, predetermined ones of the data signals are provided to control the operation of one or more circuits that are coupled to receive the data signals (504). For example, the predetermined ones of the data signals may be used to generate an address for addressing the storage device.

If operation is occurring in a second ECC mode, the predetermined ones of the data signals are used as check bits to perform error detection on a subset of the data signals (506). Some, or all, of the errors that are detected within the subset of data signals are corrected (508). In one embodiment, errors occurring on predetermined ones of the signals included within the subset may be considered uncorrectable, and remain in the erroneous state.

Next, the corrected data signals may be used to control operation of the one or more circuits that are coupled to receive those data signals (510).

Parity bits may also be used to detect errors occurring on the data signals (512). For example, when operating in other than the first mode, errors that were not corrected may be detected using the parity bits. When operating in the first mode, parity errors on any of the data signals may be detected using the parity bits. The errors detected using the parity bits and any errors detected using the check bits are reported (514). These errors may be reported to a maintenance processor or some other error handling means, for example. The error handling means initiates recovery actions within a predetermined period of time for any errors that are detected with the parity bits. This is necessary to ensure that these errors do not adversely affect circuit operations. Recovery actions that are necessary because of errors detected using the check bits may be initiated at a time when the system is configured to readily undergo error-handling procedures (516).

The current invention provides a mechanism whereby ECC can be used to detect, then correct, errors occurring within a majority of the addresses within control store RAM 300. This protection is obtained without increasing RAM width. To ensure that ECC coverage is obtained for the maximum number of words within control store RAM 300, the ECC designator should be activated whenever control store RAM 300 is operating as a slave, and in any master scenario wherein the number of control bits required by branch logic 326 to perform addressing is small enough to allow a required number of check bits to be included within the RAM word.

Various implementations and embodiments of the current invention have been described. Nevertheless, it is understood that various modifications may be made without departing from the invention. For example, any type of memory may be used as the control store RAM. Even a Read-Only Memory (ROM) may be employed for this purpose. However, in this instance, detected errors cannot be corrected by re-writing the memory, and the affected addresses must be designated as unusable. Additionally, multiple storage devices could replace the control store RAM of FIGS. 3 and 4. In one embodiment, the data read from these storage devices need not be read from the same address if address generation logic is adapted to provide the different respective addresses. Moreover, although various registers such as the L0, L1, and L2 staging registers are described, any other suitable storage device may be used in the alternative to store data signals. In still another alternative embodiment, logic such as select circuit 405 and the L0 mask and L0 bit registers may be omitted. This logic is optionally provided to add programming capabilities to the design. Other design modifications are possible. Finally, it will be understood that although the inventive system is described as being employed within an arithmetic section of an instruction processor, it may be usefully included within any digital control system of the type that may employ a control store memory. Accordingly, these and other embodiments are within the scope of the following claims.

What is claimed is:

1. A control system, comprising:
   a storage device to store data signals and a mode designator, the mode designator to select a first or a second mode of operation, wherein the storage device includes a memory having multiple addressable storage locations, each for storing a different respective set of data signals and a respective mode designator to control how the data signals are to be utilized after the data signals stored at the addressable storage location are read from the memory;
   a circuit coupled to the storage device to receive as control signals predetermined ones of the data signals along with the respective mode designators to control whether the circuit operates in a first mode or a second mode, the control signals to control operation of the circuit when the circuit is operating in the first mode; and
   Error Correction Code (ECC) logic coupled to the storage device to interpret the predetermined ones of the data signals as ECC check bits to detect errors in the data signals when the circuit is operating in the second mode.

2. The system of claim 1, wherein the circuit includes branch logic to utilize the predetermined ones of the data signals stored at an addressable storage location to generate a next address for addressing the memory if the mode designator stored at the addressable storage location indicates the circuit will operate in the first mode.

3. The system of claim 1, wherein the circuit includes logic to provide one or more functions of an instruction processor.

4. The system of claim 1 and further including a programmable storage device coupled to the circuit to select the predetermined ones of the data signals.

5. The system of claim 1, and further including at least one parity circuit coupled to the storage device to determine whether a parity error occurred on any of a predetermined set of the data signals.

6. The system of claim 5, wherein the at least one parity circuit includes a circuit to determine whether a parity error occurred on the predetermined set of the data signals when the circuit is operating in the second mode.

7. The system of claim 1, wherein the ECC logic is coupled to ECC complement logic to correct errors in the data signals that are detected by the ECC logic when operating in the second mode.

8. The system of claim 7, and further including logic coupled to the ECC complement logic to provide the data signals to the circuit for use as control signals after any errors detected by the ECC logic have been corrected.

9. A method of controlling a digital system, wherein the digital system includes a memory having multiple addressable storage locations, each storing a different respective set of data signals and wherein each of the addressable storage locations includes circuits to store a respective mode designator to control whether the system operates in a first mode or a second mode after the data signals stored at the addressable storage location are read from the memory, the method comprising:
a.) reading first data signals along with a mode indicator from one of the multiple addressable storage locations in the storage device;
b.) interpreting the first data signals as control signals to control one or more functions of the digital system if operating in a first mode of operation as determined by a state of the mode indicator; and
c.) interpreting the first data signals as Error Correction Code (ECC) signals if operating in a second mode of operation as determined by the state of the mode indicator.

10. The method of claim 9, and further including:
reading second data signals from the storage device; and
using the ECC signals to detect errors in the second data signals if operating in the second mode of operation.

11. The method of claim 10, wherein the storage device is a memory, and wherein the first and second data signals are stored at a same addressable location within the memory.

12. The method of claim 11, wherein multiple memory addresses each stores different respective first and second data signals.

13. The method of claim 12, and further including using the first data signals to generate a next address for addressing the memory when operating in the first mode of operation.

14. The method of claim 12, and further including:
reading one of the multiple memory addresses; and
interpreting at least one of the second data signals as the mode indicator to indicate whether operation is occurring in the first or the second mode of operation.

15. The method of claim 14, and Including repeating the steps of claim 17 for each of multiple memory addresses.

16. The method of claim 10, and further including, correcting an error if the error is detected in predetermined ones of the second data signals.

17. The method of claim 16, and further including programmably selecting the predetermined ones of the second data signals.

18. The method of claim 9, and further including programmably selecting the first data signals.

19. The method of claim 10, and further including interpreting one or more of the second data signals as control signals to control an arithmetic logic unit of an instruction processor.

20. The method of claim 10, an further including using parity bits to detect a parity error occurring within the first or the second data signals.

21. The method of claim 20, and further including:
reporting any error detected using the ECC signals; and
reporting any error detected using the parity bits.

22. The method of claim 21, and further including:
servicing any error detected by the ECC signals at a time that is optimal for the digital system; and
servicing any error detected using the parity bits substantially immediately.

23. A control system having a first and second mode of operation, comprising:
storage means for storing data signals and mode designators, wherein the storage means includes multiple addressable means, each for storing a different respective set of data signals and wherein each of the addressable means includes mode means for storing a respective mode designator, a state of the mode designator for selecting between operation in the first mode or the second mode after the data signals stored at the addressable means are read from the storage means;
control means for receiving the data signals with the mode designator, and for utilizing first ones of the data signals to affect operations of the control system when operating in the first mode; and
error means for interpreting the first ones of the data signals as check bits for detecting errors occurring in second ones of the data signals when the control system is operating in the second mode.

24. The system of claim 23, wherein the storage means includes means for storing the mode designator to control whether the control system is operating in the first or the second mode.

25. The system of claim 23, wherein the control means includes branch means for utilizing the first ones of the data signals to generate an address for the storage means.

26. The system of claim 23, wherein the storage means is a memory including predetermined addressable locations, each storing a different respective set of the first and second ones of the data signals.

27. The system of claim 26, wherein each of the predetermined addressable locations within the memory includes means for storing a mode designator for controlling whether the control system operates in the first or the second mode when the first and the second ones of the data signals stored at the addressable location are read from the memory.

28. The system of claim 27, wherein the error means includes means for correcting an error detected on predetermined ones of the second ones of the data signals when the control system is operating in the second mode.

29. The system of claim 28, and further including means for providing corrected ones of the second ones of the data signals to the control means for use in affecting the operations of the control system.

30. The system of claim 28, and further including parity detection means for detecting parity errors within the first or the second ones of the data signals.

31. The system of claim 30, wherein the parity detection means includes means for detecting uncorrected parity errors remaining within the second ones of the data signals.

32. The system of claim 30, and further including maintenance means for performing error recovery actions within a first time period for errors detected by the parity detection means and, for errors detected by the error means, performing error recovery actions any time the control system is appropriately configured.

33. The system of claim 23, and further including means for programmably selecting the first ones of the data signals.

34. The system of claim 28, and further including means for programmably selecting the predetermined ones of the second ones of the data signals.

* * * * *